(12) United States Patent
Young (10) Patent No.: US 11,036,565 B2
(45) Date of Patent: Jun. 15, 2021

(54) SERVICE VIRTUAL MACHINE

(71) Applicant: Rex Young, Bellevue, WA (US)

(72) Inventor: Rex Young, Bellevue, WA (US)

( * ) Notice: Subject to any disclaimer, the term of this patent is extended or adjusted under 35 U.S.C. 154(b) by 673 days.

(21) Appl. No.: 14/292,721

(22) Filed: May 30, 2014

(65) Prior Publication Data

US 2014/0282549 A1 Sep. 18, 2014

Related U.S. Application Data

(63) Continuation-in-part of application No. 12/135,879, filed on Jun. 9, 2008, now abandoned.

(51) Int. Cl.
*G06F 9/54* (2006.01)
*G06F 9/455* (2018.01)
*G06F 9/448* (2018.01)

(52) U.S. Cl.
CPC ............ *G06F 9/541* (2013.01); *G06F 9/4482* (2018.02); *G06F 9/45504* (2013.01)

(58) Field of Classification Search
CPC .... G06F 9/455; G06F 9/45504; G06F 9/4423; G06F 9/541; G06F 9/4421; G06F 9/4482
See application file for complete search history.

(56) References Cited

U.S. PATENT DOCUMENTS

| | | |
|---|---|---|
| 5,519,867 A | 5/1996 | Moeller et al. |
| 5,768,505 A | 6/1998 | Gilchrist et al. |
| 6,038,228 A | 3/2000 | Pullen et al. |
| 6,081,832 A | 6/2000 | Gilchrist et al. |
| 6,105,056 A | 8/2000 | Gilchrist et al. |
| 6,141,759 A * | 10/2000 | Braddy ................ G06F 9/5044 709/203 |
| 6,205,471 B1 | 3/2001 | Gilchrist et al. |
| 6,275,983 B1 | 8/2001 | Orton et al. |
| 6,321,275 B1 * | 11/2001 | McQuistan et al. .......... 719/330 |
| 6,351,778 B1 | 2/2002 | Orton et al. |

(Continued)

OTHER PUBLICATIONS

Hapner et al., Java Message Service Specification, Version 1.1, Apr. 12, 2002, 140 pages, Sun Microsystems, Inc.

(Continued)

*Primary Examiner* — Doon Y Chow
*Assistant Examiner* — Carina Yun (57) ABSTRACT

Technology is disclosed for processing in a computer program a request received by a service virtual machine (SVM). The technology can receive a request in either a first form or a second form, wherein the first form includes a target textual identifier, a reply-to textual identifier, and a parameter, and the second form includes a target textual identifier and a parameter, but not a reply-to textual identifier; identify, based on the received target textual identifier, a procedure; invoke the identified procedure and providing a value of the received parameter to the invoked procedure; in an event the received request is in the first form: receive a result from the invoked procedure; form a reply-to request in the second form, the second form including as a target textual identifier the reply-to textual identifier in the received request, and as a parameter the result received from the invoked procedure, further wherein the second form does not include a reply-to textual identifier; and send, to the SVM, the formed reply-to request.

17 Claims, 5 Drawing Sheets

(56) References Cited

U.S. PATENT DOCUMENTS

| | | | |
|---|---|---|---|
| 6,397,260 B1* | 5/2002 | Wils | H04L 45/00 370/401 |
| 6,453,356 B1 | 9/2002 | Sheard et al. | |
| 6,606,742 B1 | 8/2003 | Orton et al. | |
| 6,662,203 B1 | 12/2003 | Kling et al. | |
| 6,684,261 B1 | 1/2004 | Orton et al. | |
| 6,922,824 B2 | 7/2005 | Swetland | |
| 7,051,032 B2 | 5/2006 | Chu-Carroll et al. | |
| 2002/0188764 A1* | 12/2002 | Mortazavi et al. | 709/315 |
| 2003/0046449 A1* | 3/2003 | Gray-Donald | G06F 9/443 719/330 |
| 2003/0105800 A1 | 6/2003 | Cullen | |
| 2004/0015852 A1 | 1/2004 | Swetland | |
| 2004/0064821 A1 | 4/2004 | Rousselle | |
| 2004/0103416 A1 | 5/2004 | Orton et al. | |
| 2005/0193397 A1 | 9/2005 | Corenthin et al. | |
| 2006/0200488 A1 | 9/2006 | Chu-Carroll et al. | |
| 2006/0271570 A1 | 11/2006 | Bearden et al. | |
| 2007/0121631 A1 | 5/2007 | Krikorian et al. | |
| 2007/0156808 A1 | 7/2007 | Koegel et al. | |
| 2009/0307712 A1 | 12/2009 | Young | |
| 2011/0196914 A1* | 8/2011 | Tribbett | G06F 9/541 709/203 |
| 2012/0185834 A1* | 7/2012 | Ohrstrom | 717/148 |
| 2012/0254862 A1* | 10/2012 | Dong | G06F 9/4856 718/1 |

OTHER PUBLICATIONS

Aiyagari et al., AMPQ: A General-Purpose Middleware Standard, 2006, 291 pages.
MPI: A Message-Passing Interface Standard, Version 2.1, Message Passing Interface Forum, Jun. 23, 2008, 608 pages.
Geist et al., PVM: Parallel Virtual Machine: A Users' Guide and Tutorial for Networked Parallel Computing, The MIT Press, 1994, 298 pages.
Hewitt of al., A Universal Modular ACTOR Formalism for Artificial Intelligence, Aug. 1973, pp. 235-245.
Observer Design Pattern, http://www.cs.clemson.edu/~malloy/courses/patterns/observer.html [Accessed Mar. 11, 2009], 9 pages.
United States Patent and Trademark Office, Non-Final Office Action; U.S. Appl. No. 12/135,879; dated Apr. 16, 2012, 20 pages.
United States Patent and Trademark Office, Non-Final Office Action; U.S. Appl. No. 12/135,879, dated Apr. 17, 2014, 18 pages.
United States Patent and Trademark Office, Final Office Action; U.S. Appl. No. 12/135,879, dated Sep. 6, 2012, 20 pages.

* cited by examiner

102
functionA (args) → invoke → 104
functionA (args) {
...
}

FIG. 1B

106
objectA.methodA (args) → invoke → 108
objectA {
...
methodA (args) {
...
}
}

320
```
svm.call ("order.place", new Object[]{"computer", 1}, "order.pay");
```

322
323
```
svm {
  void call (ServiceID, args, RelyToID)
  {
    Object result = null;
    switch (Service ID)
    {
      case "order.place":
        result = sales.actionA ((String)args[0],
                                (Integer)args[1]);
        break;
      case "order.pay" :
        result = sales.actionB ((Double)args[0]);
        break;
      case "order.pickup" :
        result = shipping.actionC ((String)args[0]);
        break;
    }
    if (ReplyToID != null) {
      this.call (ReplyToID, new Object[]{result}, null);
    }
  }
  ...
}
```

324
```
"order"
 - "place"
 - "pay"
 - "pickup"
```

326
```
sales {
  Double actionA (String product,
                  Integer qty) {
    ...
  }
  void actionB (Double amount) {
    ...
  }
  void actionC (String address) {
    ...
  }
}
```

328
```
shipping {
  void actionC (String address) {
    ...
  }
}
```

510 a JavaScript program

```
511 svm1.call("svmA::order.place", args);
512 svm1.call("svmB::product-ship", args);
513 svm1.call("svmC::return-product", args);
```

514 svm1
- "svmA"

515
- "order"
- "place"
- "pay"

516 "refund"

520 a Java program

524 svm2
- "svmB"

525
- "product"
- "pack"
- "ship"

526 "recycle"

```
svm2.call("svmA::order.place", args);
svm2.call("svmB::product-ship", args);
svm2.call("svmC::return-product", args);
```

530 a C# program

534 svm3
- "svmC"

535 "replace-product"
536 "return-product"

```
svm3.call("svmA::order.place", args);
svm3.call("svmB::product-ship", args);
svm3.call("svmC::return-product", args);
```

502 network of SVMs

*FIG. 5*

SERVICE VIRTUAL MACHINE

CROSS-REFERENCE TO RELATED APPLICATION(S)

This patent application is a continuation-in-part of U.S. patent application Ser. No. 12/135,879, entitled ACTOR VIRTUAL MACHINE, filed on Jun. 9, 2008, which is incorporated herein in its entirety by reference.

BACKGROUND

Programming languages that support imperative programming (e.g., C and Pascal) can organize code into procedures. A procedure has a name and a body. The name of a procedure serves as a hardcoded reference to the procedure, and the body of a procedure contains a sequence of program instructions (e.g., statements). Procedures are invokable (also referred to as callable). A procedure being invoked may take a number of parameters (also referred to as arguments) from a caller as input and return one or more results back to the caller as output. Inputs and outputs are optional. The caller can be the same procedure (as in recursion), a different procedure, or even another type of programming unit (e.g., an unnamed code block). To invoke a procedure, a caller uses a calling statement, in which the caller specifies a reference to the target procedure, which can be the name of the target procedure, and provides arguments as required by the target procedure.

Programming languages that support objects (e.g., Java, JavaScript, C#, and C++) can further organize procedures into objects. To invoke a procedure in an object, a caller has to specify an extra reference in a calling statement in addition to a reference to the target procedure; this extra reference is a reference (also known as a pointer) to the target object. Aside from this, passing input parameters to and receiving return values from a procedure in an object are the same as with standalone procedures.

In different programming languages, a procedure may be called a function, a routine, a subroutine, or a subprogram. A procedure that is not associated with or provided by another programming unit can be called a standalone or global procedure. In programming languages that support objects, a procedure that is associated with or provided by another programming unit (e.g., an object, a class, a prototype) can also be called a method.

DETAILED DESCRIPTION

Technology is described for implementing and using a service virtual machine ("SVM"). A computer-readable storage medium may store instructions for performing embodiments of the methods disclosed herein. In various embodiments, an SVM can be a native procedure or object in a computer program that translates invocation on virtual programming units to invocation on native programming units with various add-on features. In various embodiments, virtual programming units can serve as interfaces for native programming units.

As used herein, the term "native" refers to programming units (e.g., procedures, methods, objects) that are directly supported by syntax and/or runtime libraries or other logic of an underlying programming language. This contrasts with virtual programming units (e.g., virtual procedures, virtual methods, virtual objects), which are not native to the underlying programming language and are supported by an SVM. Virtual programming units are bodiless programming units that only have textual identifiers ("IDs") that can serve as references to the virtual programming units.

Figure 1A:
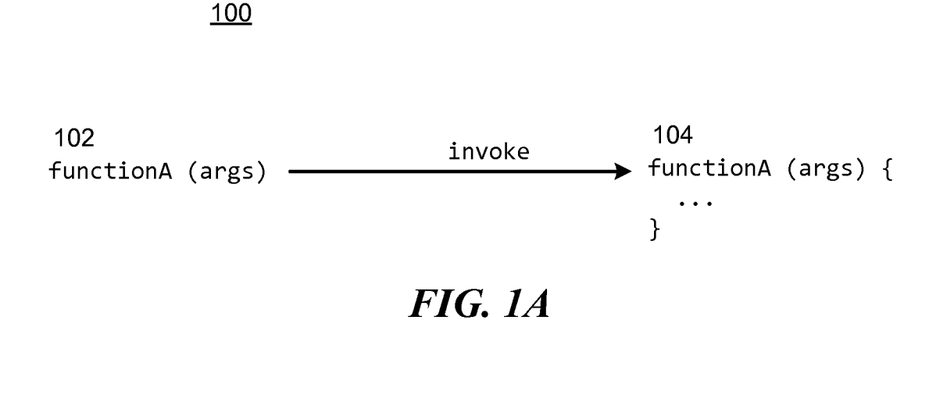
FIG. 1A is a call invocation diagram illustrating a calling statement that invokes a procedure in a program that supports procedures.

Turning now to the Figures, FIG. 1A is a call invocation diagram illustrating a calling statement that invokes a procedure in a program that supports procedures. A caller uses a calling statement 102 ("functionA (args)") that specifies only a reference (functionA) to the target procedure 104.

Figure 1B:
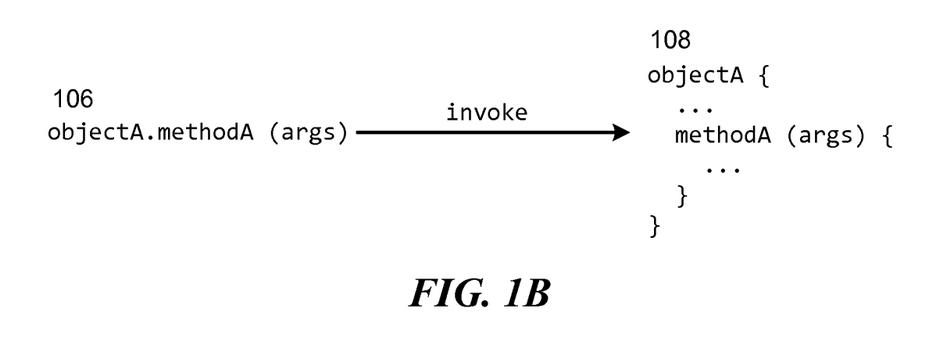
FIG. 1B is a call invocation diagram illustrating a calling statement that invokes a method in an object in a program that supports objects.

FIG. 1B is a call invocation diagram illustrating a calling statement that invokes a method in an object in a program that supports objects. A caller uses a calling statement 106 ("objectA.methodA (args)") that specifies a reference (objectA) to a target object 108 and a reference (methodA) to the target method in the target object 108.

In various embodiments, SVMs build an abstraction layer above underlying languages (and their runtime code) to support virtual programming units, e.g., virtual procedures. Virtual procedures have Procedure IDs, which can serve as references to the virtual procedures.

In various embodiments, an SVM can implement a virtual procedure by associating it with a native procedure. Thus invocation of a virtual procedure causes invocation of the associated native procedure. A caller can invoke a virtual procedure by submitting a request (which is data such as a message) to an SVM that hosts the virtual procedure. In the request, the caller specifies a Procedure ID to reference the target virtual procedure. The caller may also provide arguments in the request as required by the target virtual procedure.

Figure 2A:
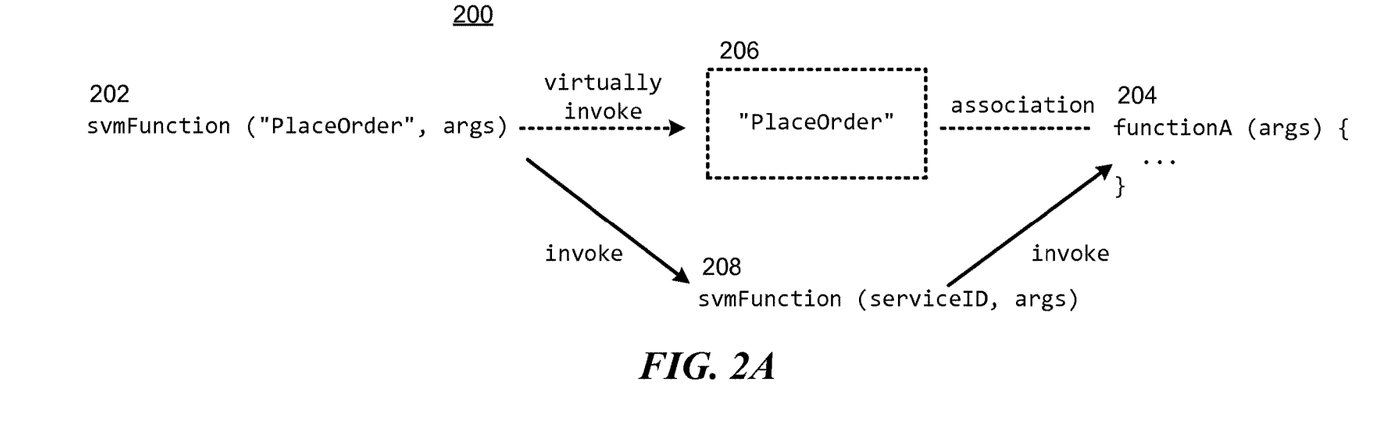
FIG. 2A is a call invocation diagram illustrating an SVM and a service that are implemented in a language that supports procedures.

FIG. 2A is a call invocation diagram illustrating an SVM and a virtual procedure that are implemented in a language that supports procedures. The SVM is implemented as a native procedure svmFunction ( ) 208. The virtual procedure 206 has a Procedure ID "PlaceOrder". To invoke the virtual procedure 206, a caller creates a request and submits the request to the SVM 208 by using a calling statement 202. The request, which is in form of arguments in the calling statement 202, specifies "PlaceOrder" as a reference to the virtual procedure 206. The SVM 208 processes the received request by interpreting the request, identifying the virtual procedure 206 as the target, and invoking the native procedure functionA ( ) 204 that is known by the SVM 208 as associated with the virtual procedure 206.

Figure 2B:
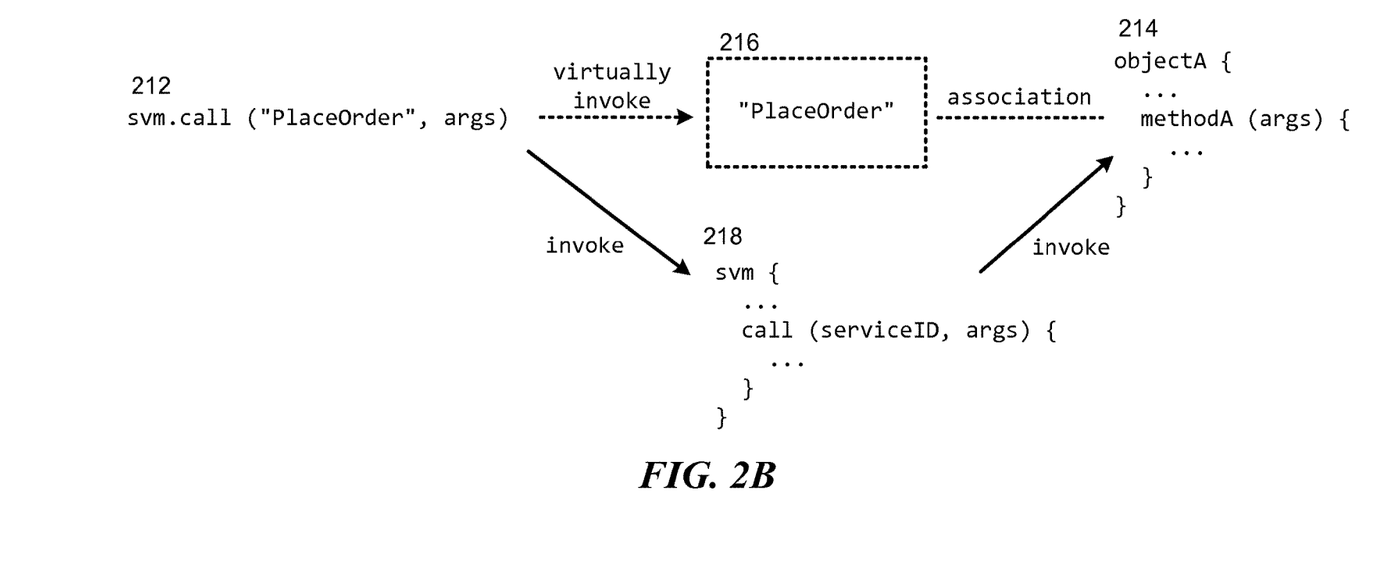
FIG. 2B is a call invocation diagram illustrating an SVM and a service that are implemented in a language that supports objects.

FIG. 2B is a call invocation diagram illustrating an SVM and a virtual procedure that are implemented in a language that supports objects. The SVM is implemented as a native object svm 218. The virtual procedure 216 has a Procedure ID "PlaceOrder". To invoke the virtual procedure 216, a caller creates a request and submits the request to the SVM 218 by using a calling statement 212. The request, which is in form of arguments in the calling statement 212, specifies "PlaceOrder" as a reference to the virtual procedure 216. The SVM 218 processes the received request by interpreting the request, identifying the virtual procedure 216 as the target, and invoking the methodA ( ) in the native object objectA 214 that is known by the SVM 218 as associated with the virtual procedure 216.

In various embodiments, virtual programming units can be built into a hierarchy. A virtual object can be created by containing a number of virtual methods. A virtual object has an Object ID and a virtual method has a Method ID. A virtual object can be identified by its Object ID but a virtual method cannot be identified by its Method ID alone. Instead, a virtual method can be identified by its owning Object ID and its Method ID due to the hierarchical relationship.

In order to invoke a virtual programming unit, a request can contain a full reference to specify the target virtual programming unit. For a virtual procedure, a Procedure ID is its full reference. For a virtual object, an Object ID is its full reference. For a virtual method, which is in a lower part of a hierarchy, its owning Object ID and its Method ID together make its full reference. A virtual programming unit can be referred to as a virtual service (or simply a service), and a full reference to a service can be referred to as a Service ID. In various embodiments, an SVM can accept a Service ID in various formats and manipulate it into other formats (e.g., accept a one-piece ID and break it into smaller IDs, accept smaller IDs and combine them into a one-piece ID, accept an encoded Service ID and decode it).

In various embodiments, an SVM can implement a virtual programming unit by associating it with a callable native programming unit. An SVM can associate a virtual programming unit with a callable native programming unit regardless of their types and hierarchies (e.g., a virtual procedure may associate with a native procedure, a virtual method may associate with a native method, a virtual procedure may associate with a native method and vice versa, and a virtual object itself may even associate with a native procedure or method, etc.).

An SVM can support a reply-to feature for a request that contains a reply-to Service ID in addition to a target Service ID. For such a request, an SVM will collect return values from invoked native programming unit in processing the request and form a reply-to request. The reply-to request contains a target Service ID, which is the same as the reply-to Service ID in the current request, and parameters, which are the collected return values.

Figure 3:
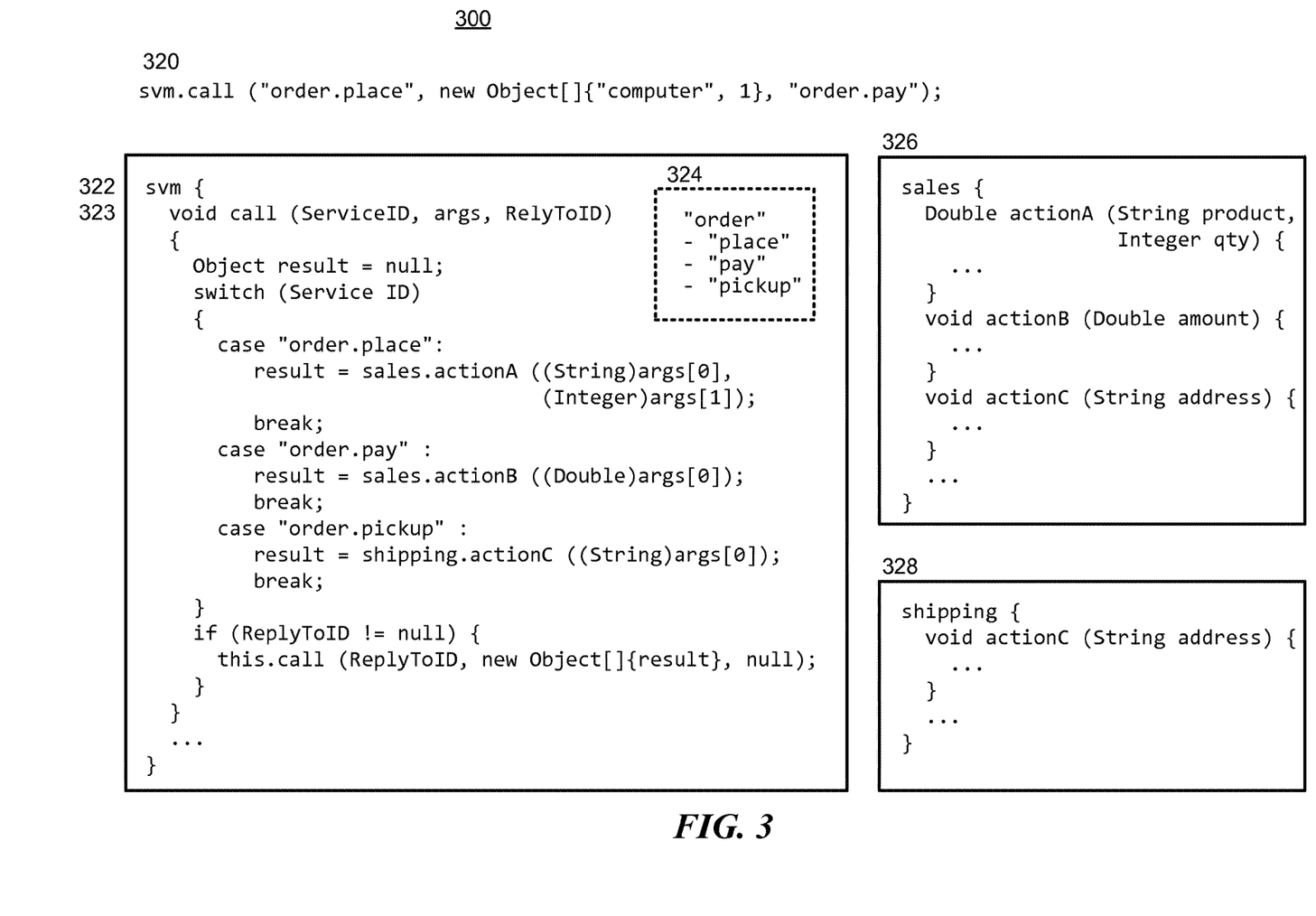
FIG. 3 is a call flow diagram illustrating a first sample SVM implemented as an object in a language that supports objects.

FIG. 3 is a calling flow diagram illustrating a first sample SVM implemented as an object in a Java-like pseudo language. The first sample SVM is implemented as a native object svm 322 that works as a standalone SVM. A standalone SVM processes all received requests and does not consider forwarding requests for other SVMs.

The SVM 322 supports a virtual object "order" 324 containing three virtual methods "place", "pay", and "pickup". The SVM 322 chooses not to decode their Service IDs into Object IDs and Method IDs, but instead hardcodes the associations between these virtual methods and native methods. The virtual methods "order.place" and "order.pay" are associated with the methods actionA ( ) and actionB ( ), respectively, in a native object sales 326. The virtual method "order.pickup" is associated with the method actionC ( ) in a native object shipping 328.

A caller uses a calling statement 320 to submit a request by invoking a method, call ( ) 323, provided by the SVM 322. The request contains a target Service ID "order.place", an array of parameters ("computer" as a product code, and 1 as quantity), and a reply-to Service ID "order.pay".

The call ( ) 323 invokes the actionA ( ) in the native object sales 326 that is associated with the Service ID "order.place" according to the source code. Since the ReplyToID is not null ("order.pay" is provided as the ReplyToID in the request), the call ( ) 323 forms a reply-to request and submits it as a new request. In various embodiments, an SVM can handle any error that happens during the processing of requests by logging errors (e.g., in a local log file).

An SVM can provide other means in addition to a local API (e.g., a method, a procedure) to receive requests from local and distributed callers. Such means may include socket connections, queues, messaging services, databases, etc., to which callers can submit requests. Local callers of an SVM are callers that are in the same program with the SVM. Distributed callers are callers in other programs that can be running on other computers (and can even be written in other languages). Any means through which an SVM receives requests can also be referred to as a channel of the SVM for submitting requests. A channel can be directly provided by an SVM (e.g., a local API) in a dedicated fashion, as requests submitted to such a channel will be only received by the SVM. A channel may also be supported by an SVM (e.g., a messaging system). Such a channel may be shared by multiple SVMs, each of which can access submitted requests; however doing so may create ambiguity about which SVM should pick up a particular request. If a shared channel is unavoidable, ambiguity in picking up requests may be resolved by dedicating a unique textual SVM ID to every SVM with access to the shared channel and by using the SVM ID in every request for the intended receiving SVM through such a channel.

Two SVMs that have unique textual SVM IDs can be connected to each other and send requests to each other directly through their channels. Connected SVMs are called neighbors of each other. A term "SVM connection" (or simply "connection") describes the status of two connected SVMs. It does not refer to particular channels, but rather represents a functional connectivity between the SVMs.

A group of interconnected SVMs can form a network of SVMs (also referred to as an SVM network). An SVM network can be used to transfer a request from a source SVM to a target SVM through intermediate SVMs between the source and the target. Each intermediate SVM receives the request from one of its neighbors and sends the request to another neighbor until the request eventually reaches the target SVM. The series of intermediate SVMs the request passes through in sequence is called a route or path between the source and target SVMs.

Figure 4:
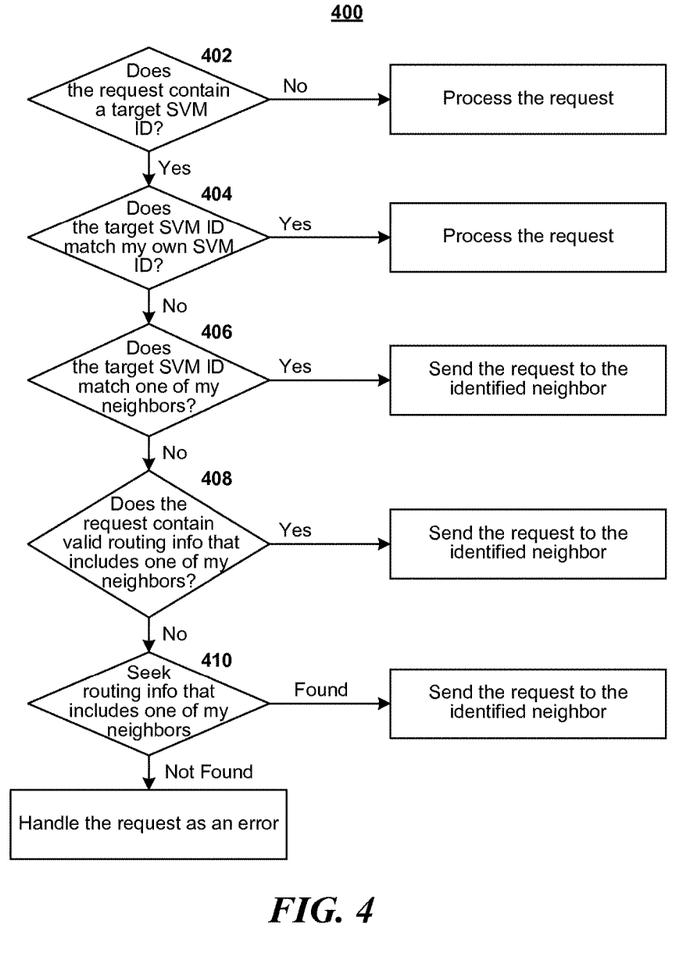
FIG. 4 is a call flow diagram illustrating the logic a source SVM that receives a request can use to determine how to forward the request to its target SVM in the same SVM network.

FIG. 4 is a call flow diagram illustrating the logic a source SVM that receives a request can use to determine how to forward the request to its target SVM in the same SVM network. When an SVM receives a request, the SVM performs a first check 402 to see whether the request contains a target SVM ID. If it does not, the SVM processes the request. If it does, the SVM performs a second check 404 to see whether the target SVM ID matches its own SVM ID. If it does, the SVM processes the request. If it does not, the SVM performs a third check 406 to see whether the target SVM is one of its neighbors. If it is, the SVM sends the request to the identified neighbor. If it is not, the SVM performs a fourth check 408 to see whether the request contains valid routing information that indicates one of its neighbors is in or stores a route to the target SVM. If such routing information is found, the SVM sends the request to the identified neighbor. If such routing information is not found, the SVM performs an action 410 to seek routing information that indicates one of its neighbors is in or stores a route to the target SVM internally (e.g., performing its owning routing to generate routing information for the request, reading a routing table in memory or from a configuration file) and/or externally (e.g., contacting other SVMs or routers). If such routing information is still not found after seeking, the SVM handles the request as an error (e.g., discards the request silently, logs the request with error messages, sends the request to a predefined administration SVM). If such routing information is found after seeking, the SVM sends the request to the identified neighbor.

Figure 5:
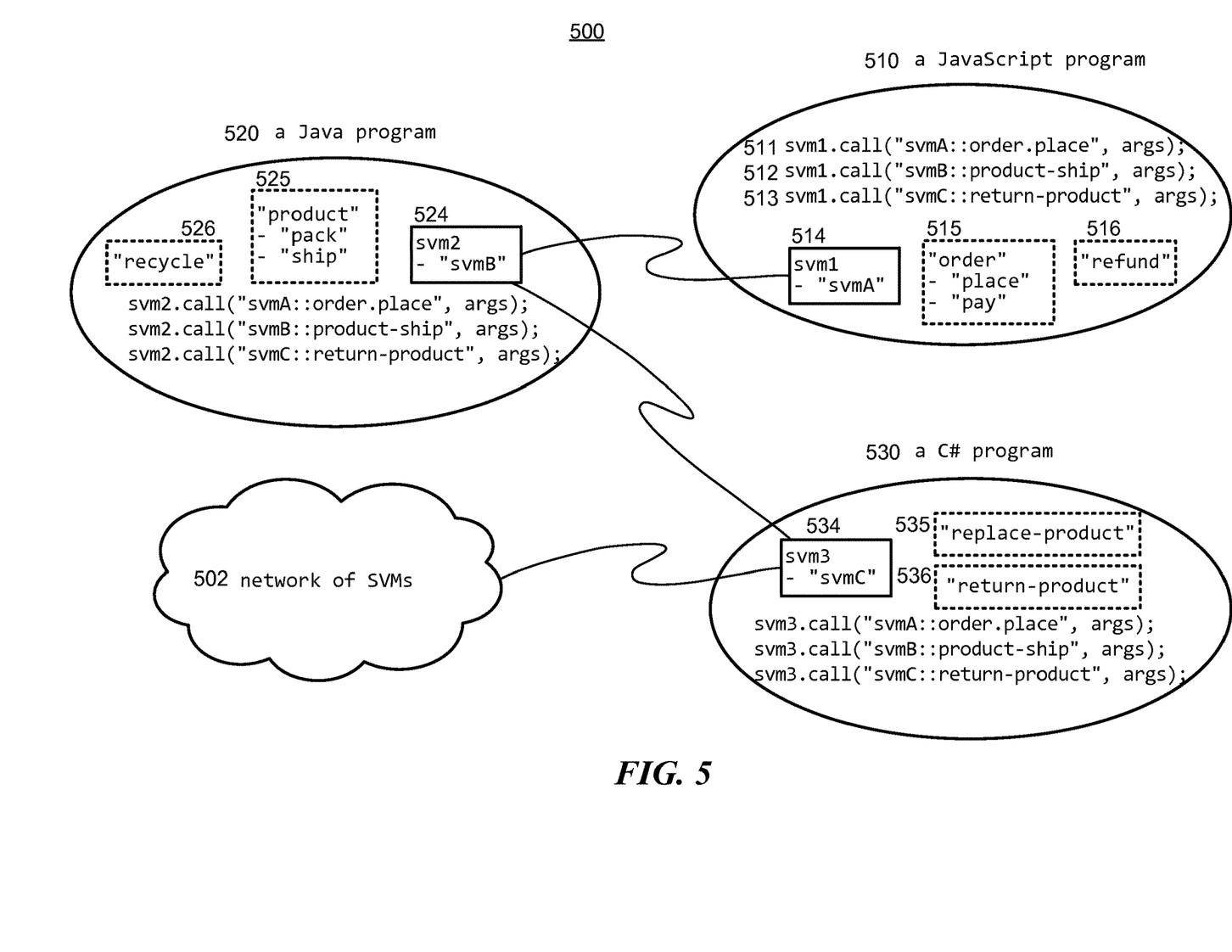
FIG. 5 is a call flow diagram illustrating how to invoke local and distributed services.

FIG. 5 is a call flow diagram illustrating how to invoke local and distributed services. A JavaScript program 510 includes an SVM svm1 (SVM ID "svmA") 514, a virtual object "order" 515, and a virtual procedure "refund" 516. A Java program 520 includes an SVM svm2 (SVM ID "svmB") 524, a virtual object "product" 525, and a virtual procedure "recycle" 526. A C# program 530 includes an SVM svm3 (SVM ID "svmC") 534, a first virtual procedure "replace-product" 535, and a second virtual procedure "return-product" 536. The svm1 514 and the svm2 524 are connected neighbors; the svm2 524 and the svm3 534 are also connected neighbors.

When the svm1 514 receives a request, the svm1 514 can use the logic described in FIG. 4 to determine how to process or forward the request. The svm1 514 will process a request 511 as its target SVM ID "svmA" matches the SVM ID of the svm1 514. The svm1 514 accepts a Service ID containing an Object ID and a Method ID that are separated by a dot.

The svm1 514 will forward a request 512 to the svm2 524 as its target SVM ID "svmB" matches the SVM ID of the svm2 524. The svm2 524 will process the request 512. The svm2 524 accepts a Service ID containing an Object ID and a Method ID that are separated by a hyphen.

The svm1 514 will forward a request 513 to the svm2 524 if the svm1 514 knows that the svm3 534 can be reached through the svm2 524. The svm1 514 can learn this knowledge by having it hardcoded, loading it from a configuration file, performing routing, etc. Similarly, the svm2 524 will forward the request 513 to the svm3 534, which will process the request 513. The svm3 534 accepts a Service ID as is, without breaking it into smaller IDs.

An SVM operates "on top of" a high-level programming language. This means an SVM can uses advanced features provided by an underlying language. An SVM can use type introspection to determine the type or properties of an identified native object. If the native object is of a known type, the SVM can typecast it to that type and perform known operations on it (e.g., invoke known methods on the type). An SVM can use reflection to obtain a reference to a method in a native object by its textual name and use the reference to invoke the method. With the reflection feature, an SVM can associate methods in a native object to virtual programming units without the native object being aware of the associate and participation of SVM.

An SVM can use multi-threading to receive a request and invoke a targeted native programming unit asynchronously. This helps an SVM process a large number of requests received in a short time period in a stable order (e.g., first-come, first-served). An SVM can still achieve synchronism between receiving requests and invoking targeted native programming units on an underlying language that does not provide multi-threading but supports independent thread scheduling (e.g., JavaScript). A same thread that appears at the same place in the code at different times due to independent thread scheduling can be viewed as different threads. An SVM can provide various add-on features in the processing of requests at multi-threaded runtimes. An SVM can process concurrent requests that target a same native object in a sequential manner. Thus methods in the native object will only be invoked by one thread at a time. This provides the native object with a single-threaded environment. An SVM can associate a virtual programming unit with multiple native objects, each of which can carry out a request by a thread. Thus concurrent requests that target the same virtual programming unit can be carried out concurrently by these multiple native objects.

FIG. 6 is a source code listing for a second sample SVM that illustrates how to provide add-on features for processing requests by utilizing advanced features provided by underlying languages. Source code (below) provides additional details.

The second sample SVM is an object of the JavaSVM class, which is shown at Line 9-142 (see source code below). The second sample SVM provides a method registerObject ( ) (as shown at Line 25-27) to receive associations (as shown at Line 25) for creation of new virtual objects. All associations are stored in a variable called associationMap (as shown at Line 12) from which an association can be retrieved by its unique Object ID.

An association contains an Object ID, one or more associated native objects, and instructions that can customize the processing of requests that target the virtual object. According to these instructions (as shown at Line 14-24), an association is not required to define virtual methods. The second sample SVM will locate a method in a native object in a way specified by the method policy.

The association should provide a MethodPolicy. The second sample SVM supports two method policies: "same-name" and "java-interface". The method policy "same-name" instructs the second sample SVM to look for a method in a native object based on the Method ID in a request. The second sample SVM employs the reflection feature provided by Java language runtimes to perform the lookup (as shown at Line 45-50). As a result, a native method whose textual method name is the same as the Method ID is identified and used for invocation (as shown at Line 110-112). The method policy "java-interface" instructs the second sample SVM that a native object is an instance of a known HandlerInterface (as shown at Line 144-146). Thus the second sample SVM will typecast the native object to the HandlerInterface and invoke a known method, onRequest ( ) (as shown at Line 113-116).

The association should provide a ThreadPolicy. The second sample SVM supports four thread policies: "thread-pool", "GUI-thread", "single-threaded" and "load-balancer". A thread policy instructs the second sample SVM to use a specific thread in a specific way to invoke a method in a native object. The thread policy "thread-pool" instructs the second sample SVM to use a thread from a thread pool (as shown at Line 11) to invoke a native method (as shown at Line 57-62). The thread policy "GUI-thread" instructs the second sample SVM to use the Java Swing thread to invoke a native method (as shown at Line 63-68). The thread policy "single-threaded" instructs the second sample SVM to use a thread from the thread pool to invoke a native method such that only one thread can invoke a method in a native object at a time even if there are multiple concurrent requests targeting the same native object (as shown at Line 69-80). The thread policy "load-balancer" instructs the second sample SVM to first choose a native object that is not currently being invoked from all native objects that are associated with the same Object ID; then the second sample SVM uses a thread from the thread pool to invoke a method on the chosen native object (as shown at Line 81-100).

The association should provide one or more NativeObjects to be associated with the virtual object. The number of native objects is determined by the thread policy. For method policies "thread-pool", "GUI-thread" and "single-threaded", one native object is needed. For method policy "load-balancer", a number of native objects are needed, as the second sample SVM needs a pool of native objects to perform load-balancing.

The association should provide zero or more NativeLocks. Locks are used to ensure that only one thread can invoke a method in a native object at a time. This feature provides protection to a native object such that all methods in the native object can be coded in single-threaded fashion. The number of native objects is determined by the thread policy. For the thread policy "thread-pool", locks are not needed and native objects should handle multi-threading on their own. For the thread policy "GUI-thread", locks are not needed as the Java Swing thread is a single thread. For the thread policy "single-threaded", one lock is needed as there is one native object in this case. For the thread policy "load-balancer", a number of locks are needed such that each native object is protected by a lock.

The second sample SVM provides a method invokeService ( ) (shown at Line 29-39) to receive and process requests that invoke virtual services. A request contains a target Service ID, a reply-to Service ID, and a number of parameters. The invokeService ( ) prepares to process a received request by creating a temporary variable called session that stores all intermediate data produced and shared by all steps of processing, decoding the target Service ID into an Object ID and a Method ID, and retrieving an association by the decoded Object ID (as shown at Line 30-36).

With the identified virtual object and association, the invokeService ( ) continues to process the request by carrying out the method policy and thread policy specified in the association (as shown at Line 37-38). The second sample SVM provides a method, identifyNativeMethod ( ) (as shown at Line 41-54), to carry out method policy. The identifyNativeMethod ( ) locates both a target native object and a target native method and stores them into the session for next steps. If the method policy in the request is "java-interface", the identifyNativeMethod ( ) locates a target native object only, as the target native object is an instance of a known interface HandlerInterface.

The second sample SVM provides a method, identifyThreadAndInvoke ( ) (as shown at Line 56-102), to carry out thread policy. The identifyThreadAndInvoke ( ) is responsible for choosing a thread specified by the thread policy in the request and submitting the target native method to the identified thread for execution. The second sample SVM provides another method, invokeAndReply ( ) (as shown at Line 104-126), to invoke the target native method.

This design ensures that target native methods are executed asynchronously. When a caller submits a request to the SVM at the invokeService ( ), the caller's thread steps into the invokeService ( ) and executes codes there, and the caller's thread continues through the identifyNativeMethod ( ) and the identifyThreadAndInvoke ( ). In other words, the processing of requests is actually performed by the caller's thread. The identifyThreadAndInvoke ( ) stops the caller's thread by switching the thread context for invoking of the target native method (as shown at Line 58, 64, 70 and 82).

For the thread policy "thread-pool", the identifyThreadAndInvoke ( ) simply submits the invokeAndReply ( ) to a thread from the thread pool (as shown at Line 57-62). For the thread policy "GUI-thread", the identifyThreadAndInvoke ( ) submits the invokeAndReply ( ) to the Java Swing thread (as shown at Line 63-68). For the thread policy "single-threaded", the identifyThreadAndInvoke ( ) submits the invokeAndReply ( ) to a thread from the thread pool with extra logics (as shown at Line 69-80). The extra logics ensure that only one thread can invoke a method in the target native object at a time. For thread policy "load-balancer", the identifyThreadAndInvoke ( ) submits the invokeAndReply ( ) to a thread from the thread pool with extra logics (as shown at Line 81-100). The extra logics can detect whether another thread is currently executing a method in a target native object so that the logics can identify a target native object that is available for use.

As a last step, the invokeAndReply ( ) receives the identified native object and the parameters in the request (as shown at Line 106-107) and decides to invoke the native object either using reflection (as shown at Line 110-112) or through typecasting (as shown at Line 113-116) based on the method policy. In either case, the invokeAndReply ( ) collects return values from the invoked method in the native object. If the request specifies a reply-to Service ID, the invokeAndReply ( ) forms a reply-to request that contains the collected return values and submits it to the SVM at the invokeService ( ) (as shown at Line 119-122).

A reply-to request carries return values from a preceding request and targets a virtual service which can be the caller, if it is a virtual service, or other virtual service. In order for a conventional non-service caller to receive results from a virtual service the caller just called, the caller can use a helper called token to retrieve results. A token is an object of the Token class (as shown at Line 148-185) and offers three typical usages to retrieve its results: the caller can register a listener (as shown at Line 182) and be notified when results are available; the caller can query a non-block method, isReady ( ) (as shown as Line 171), to check whether results are available; or the caller can wait for results by invoking a block method, getResult ( ) (as shown at Line 175). The second sample SVM provides a method, createNewToken ( ) (as shown at Line 128-141) to simplify the usage of a token. A simple code snippet that illustrates usage of the createNewToken ( ) and a token is shown at Line 188-191.

Routing is the process of identifying and selecting routes in an SVM network. An SVM can use a neighbor table to store all of its neighbors and their channel information. Thus the neighbor table can be used to determine whether a given SVM is a known neighbor and to retrieve channel information for sending requests to that neighbor. An SVM can use a routing table in addition to a neighbor table to assist in performing routing for received requests. A routing table may contain an entry for each target SVM that contains route information for how to reach the target SVM. Route information can be as complete as a full route to the target SVM, or as simple as a neighbor who may figure out the rest of the path, or anything in between.

When an SVM receives a request, it checks its routing table for the target SVM of the request. If an entry is found, the SVM inserts the route found in the entry into the request and passes the request to the neighbor specified by the route, which is the first intermediate SVM in the route. Every intermediate SVM in the route skips performing its own routing and passes the request to the neighbor specified by the route, which is a next intermediate SVM in the route.

If the end of the given route is the target SVM, then the given route is a full route to the target SVM. This is referred to as source routing. If the end of the given route is not the target SVM, then the given route is only a partial route to an intermediate SVM, referred to as a next hop, which is prior to the target SVM. The hop acts as a new source SVM and performs its own routing for the request towards the target SVM. This process may be repeated until the request reaches the target SVM. This is referred to as hop-by-hop routing.

A routing table can be established from source code or configuration files, and needs to be updated based on network changes that impact routing, such as SVMs that have joined, SVMs that have left, connections that have been established, and connections that have been destroyed. SVMs can update their routing tables by reloading configuration files from time to time, as a network administrator may update those configuration files based on new network changes. Or SVMs can report network changes they are aware of to each other. Thus SVMs in an SVM network can automatically learn of network changes in a real-time fashion. SVMs that exchange network changes and other routing information can employ routing algorithms and protocols such as well-known link-state and distance-vector routing protocols.

An SVM can manage local virtual services (e.g., play the role of an SVM host), perform routing (e.g., play the role of an SVM router), or do both. It also allows an SVM to play only one role. An SVM host can connect to and have an agreement with an SVM router in the same SVM network. The SVM host performs no routing and all requests (received by or generated inside the SVM host) targeting other SVMs are passed to the SVM router. The SVM router reports network changes (e.g., related to the SVM host) to other SVM routers, receives requests targeting the SVM host, and passes such requests to the SVM host.

Two SVM networks are connected if at least one SVM router from each side is connected to the other. A group of interconnected SVM networks can form a large SVM network provided that all SVM IDs are unique within the large SVM network. A large SVM network can be used to transfer a request from a source SVM in a first SVM network to a target SVM in a second SVM network. Every request that needs to be routed contains a target SVM ID. In an SVM network or a network of SVM networks that contains a massive number of SVMs, each target SVM ID is expected to carry extra information for assistance of locating a target SVM.

Using naming conventions (e.g., Domain name naming convention, Java package naming convention) can create hierarchical SVM IDs for uniqueness and organizing SVMs. In this document, Java package naming convention is used for illustration purpose. This convention uses a textual section to represent a hierarchical layer, uses dots to separate layers, and places the most top layer on the most left side (e.g., "us.wa.seattle" and "ca.bc.vancouver" are two examples).

SVMs with IDs that belong to a same layer can be placed into a same SVM network, which uses the common ID prefix as its network ID prefix. For example, SVMs with IDs that match "us.wa.seattle.*" can be placed into a first SVM network which uses the ID prefix "us.wa.seattle". Similarly SVMs with IDs "us.wa.bellevue.*" can be placed into a second SVM network with ID prefix "us.wa.bellevue".

When a first SVM router in the first SVM network "us.wa.seattle" receives a request with a target SVM ID "us.wa.bellevue.Alpha", the first SVM router can easily know the target SVM is in an SVM network with ID prefix "us.wa.bellevue". If the first and second networks are connected, the first SVM router can send the request to a second SVM router in the second SVM network "us.wa.bellevue" (assuming these two SVM networks are connected via these two SVM routers). If the first and second networks are not connected, the first SVM router can send the request to its parent SVM network "us.wa", which connects to all child SVM networks including the SVM network "us.wa.bellevue".

Routing requests through hierarchical structure should be treated as the last resort rather a first choice. An SVM network can directly connect to any other SVM networks. A request from the SVM network "us.wa.seattle" targets an SVM "ca.bc.vancouver.Zulu" can be routed directly to the SVM network "ca.bc.vancouver", if connected, rather than be routed through SVM networks "us.wa", "us", "ca", "ca.bc", and "ca.bc.vancouver".

An SVM network can have more than one ID prefix. The first and second SVM networks "us.wa.seattle" and "us.wa.bellevue" above can be merged into a single SVM network with two ID prefixes.

A large number of SVM networks can also be organized in the structure of the Internet. An SVM host or router is analogous to a host or router respectively in the Internet and an SVM ID is analogous to a domain name. Similarly every SVM ID can be assigned and mapped to an IP address thus SVMs are grouped into SVM networks based on hierarchy of their IP addresses rather than of SVM ID and use IP prefixes rather than SVM ID prefixes. Each SVM network is analogous to an autonomous system in the Internet and can be assigned a globally unique Autonomous System Number (ASN). As a result, all SVM networks are able to use exterior gateway protocols such as Border Gateway Protocol (BGP) to share routing information among them.

In the context of a standalone SVM, all requests are received and processed by such an SVM, as in this case the standalone SVM is by definition the receiving SVM and the target SVM. In such a case, callers may not need to specify the receiving SVM ID or the target SVM ID. When using a shared channel of the SVM, a caller may need to specify a receiving SVM ID. In the context of one or more SVM networks, a caller may submit a request to a receiving SVM while specifying a different target SVM. In this case, the caller must specify the target SVM ID, as a request without a target SVM ID will be treated as targeting the receiving SVM. A request that targets an SVM different from the receiving SVM may be routed to reach the target SVM by passing through a number of SVMs and channels in between. For correct handling of a request, a request can be divided into two parts: a header and a body. The header of the request contains target SVM ID. The header may also serve as storage for SVM routers storing routing information and/or instructions temporary or permanently. For this reason, the header should use a form, type and format which are supported by all SVMs. In contrast, the body of the request contains payload (as referred to as data, e.g., Service ID, Object ID, Method ID, parameters, reply-to information, etc.) that are interpreted and processed by the target SVM and are not used for performing routing.

| Source Code |
|---|

```
1   import java.lang.reflect.Method;
2   import java.util.HashMap;
3   import java.util.Map;
4   import java.util.UUID;
5   import java.util.concurrent.ThreadPoolExecutor;
6   import java.util.concurrent.locks.Lock;
7   import javax.swing.SwingUtilities;
8
9   class JavaSVM {
10
11    ThreadPoolExecutor threadPool;
12    Map associationMap;
13
14  /**
15   * An association represents a virtual object.
16   * Key                      Supported Values
17   * ---------------------------------------------------
18   * "ObjectID"               Virtual Object IDs (e.g., "order","product")
19   * "MethodPolicy"           "same-name" or "java-interface"
20   * "ThreadPolicy"           "thread-pool" or "GUI-thread" or "single-threaded" or "load-balancer"
21   * "NativeObjects"          an array of one or more Java objects
22   * "NativeLocks"            an array of zero or more Java Lock objects
23   */
24
25  public void registerObject (Map association) {
26      associationMap.put (association.get ("ObjectID"), association);
27  }
28
29  public void invokeService (String serviceID, String replytoServiceID, Object... args) {
30      Map session = new HashMap ( );
31      String[ ] idList = serviceID.split (".");
32      session.put ("ObjectID", idList[0]);
33      session.put ("MethodID", idList[1]);
34      session.put ("Parameters", args);
35      session.put ("ReplyToServiceID", replytoServiceID);
36      Map association = (Map) associationMap.get (idList[0]);
37      this.identifyNativeMethod (association, session);
38      this.identifyThreadAndInvoke (association, session);
39  }
40
41  private void identifyNativeMethod (Map association, Map session) {
42      Object firstNativeObject = ((Object[ ]) association.get ("NativeObjects"))[0];
43      session.put ("RefToNativeObject", firstNativeObject);
44      if (association.get ("MethodPolicy").equals ("same-name")) {
45          for (Method method : firstNativeObject.getClass ( ).getMethods ( )) {
46              if (session.get ("MethodID").equals (method.getName ( ))) {
47                  session.put ("RefToNativeMethod", method);
48                  return;
49              }
50          }
51      } else if (association.get ("MethodPolicy").equals ("java-interface")) {
52          return;
53      }
54  }
55
56  private void identifyThreadAndInvoke (final Map association, final Map session) {
57      if (association.get ("ThreadPolicy").equals ("thread-pool")) {
58          threadPool.submit (new Runnable ( ) {
59              public void run ( ) {
60                  JavaSVM.this.invokeAndReply (association, session);
61              }
62          });
63      } else if (association.get ("ThreadPolicy").equals ("GUI-thread")) {
64          SwingUtilities.invokeLater (new Runnable ( ) {
65              public void run ( ) {
66                  JavaSVM.this.invokeAndReply (association, session);
67              }
68          });
69      } else if (association.get ("ThreadPolicy").equals ("single-threaded")) {
70          threadPool.submit (new Runnable ( ) {
71              public void run ( ) {
72                  Lock firstImplLock = ((Lock[ ]) association.get ("NativeLocks"))[0];
73                  firstImplLock.lock ( );
74                  try {
75                      JavaSVM.this.invokeAndReply (association, session);
76                  } finally {
77                      firstImplLock.unlock ( );
78                  }
79              }
```

-continued

| Source Code |
|---|

```
 80        });
 81    } else if (association.get ("ThreadPolicy").equals ("load-balancer")) {
 82      threadPool.submit (new Runnable ( ) {
 83        public void run ( ) {
 84          Object[ ] implObjects = (Object[ ]) association.get ("NativeObjects");
 85          Lock[ ] implLocks = (Lock[ ]) association.get ("NativeLocks");
 86          while (true) {
 87            for (int i = 0; i < implObjects.length; i++) {
 88              if (implLocks[i].tryLock ( )) {
 89                try {
 90                  session.put ("RefToNativeObject", implObjects[i]);
 91                  JavaSVM.this.invokeAndReply (association, session);
 92                  return;
 93                } finally {
 94                  implLocks[i].unlock ( );
 95                }
 96              }
 97            }
 98          }
 99        }
100      });
101    }
102 }
103
104 private void invokeAndReply (Map association, Map session) {
105    try {
106      Object implObject = session.get ("RefToNativeObject");
107      Object[ ] args = (Object[ ]) session.get ("Parameters");
108      Object returnValue = null;
109
110      if (association.get ("MethodPolicy").equals ("same-name")) {
111        Method implMethod = (Method) session.get ("RefToNativeMethod");
112        returnValue = implMethod.invoke (implObject, args);
113      } else if (association.get ("MethodPolicy").equals ("java-interface")) {
114        HandlerInterface interfaceImpl = (HandlerInterface) implObject;
115        String methodID = session.get ("MethodID").toString ( );
116        returnValue = interfaceImpl.onRequest (methodID, args);
117      }
118
119      String replytoServiceID = (String) session.get ("ReplyToServiceID");
120      if (replytoServiceID != null) {
121        this.invokeService (replytoServiceID, null, returnValue);
122      }
123    } catch (Exception error) {
124      // log the error
125    }
126 }
127
128 public Token createNewToken ( ) {
129    Token token = new Token ( );
130    token.objectID = UUID.randomUUID ( ).toString ( );
131
132    Map association = new HashMap ( );
133    association.put ("ObjectID", token.objectID);
134    association.put ("MethodPolicy","same-name");
135    association.put ("Thread Policy","thread-pool");
136    association.put ("NativeObjects", new Object[ ] { token });
137
138    this.registerObject (association);
139
140      return token;
141    }
142 }
143
144 interface HandlerInterface {
145    Object onRequest (String methodID, Object... args);
146 }
147
148 class Token {
149    String objectID = null;
150    boolean ready = false;
151    Object result = null;
152    ResultListener listener = null;
153
154    public interface ResultListener {
155      void onResult (Object result);
156    }
```

```
Source Code
157
158   public String getServiceID ( ) {
159       return objectID + ".setResult";
160   }
161
162   synchronized void setResult (Object... args) {
163       result = args;
164       ready = true;
165       this.notifyAll ( );
166       if (listener != null) {
167           listener.onResult (result);
168       }
169   }
170
171   synchronized boolean isReady ( ) {
172       return ready;
173   }
174
175   synchronized Object getResult ( ) throws Exception {
176       if (!isReady ( )) {
177           this.wait ( );
178       }
179       return result;
180   }
181
182   synchronized void setListener (ResultListener resultReadinessListener) {
183       listener = resultReadinessListener;
184   }
185 }
186
187 // Code snippet that illustrates usage of token
188 Token token = javaSVM.createNewToken ( );
189 javaSVM.invokeService ("order.place", token.getServiceID ( ), "computer", 1);
190 double amount = (Double) token.getResult ( );
191 javaSVM.invokeService ("order.pay", null, amount);
```

I claim:

1. A method for processing, in a computer program, requests received by a service virtual machine (SVM), comprising:
   receiving, by the SVM, a first request from within the computer program, wherein the received first request includes at least a target service textual identifier and a parameter;
   identifying, based on the received target service textual identifier, a callable programming unit within the computer program;
   invoking the identified callable programming unit and providing a value of the received parameter to the invoked callable programming unit;
   processing, by the SVM, a next request when the received first request does not include a reply-to service textual identifier;
   in an event the received first request also includes a reply-to service textual identifier:
      receiving a result from the invoked callable programming unit, wherein the result is based at least in part on the value of the received parameter from the first request;
      forming a second request to be sent to the SVM, wherein the formed second request includes a second target service textual identifier and a second parameter, wherein the second target service textual identifier is the received reply-to service textual identifier, and wherein the second parameter is the result received from the invoked callable programming unit; and
      sending the formed second request to the SVM from within the computer program such that the second request carries the result from the preceding first request to the SVM as a subsequent request and the second request is only formed and sent to the SVM after the callable programming unit, identified by the target service textual identifier in the first request, generates the result for the second request to be processed by the SVM.

2. The method of claim 1, wherein the identified callable programming unit is a standalone procedure or a global procedure.

3. The method of claim 1, wherein the identified callable programming unit is a method provided by an object.

4. The method of claim 1, wherein the identified callable programming unit is a method provided by a class.

5. The method of claim 1, wherein the target service textual identifier includes an object textual identifier and a method textual identifier identifying a callable programming unit.

6. The method of claim 5, further comprising identifying an object based on the object textual identifier.

7. The method of claim 6, further comprising identifying a method in the identified object based on the method textual identifier, wherein the identified callable programming unit is the identified method.

8. The method of claim 7, further comprising invoking the identified method based on the identified object not being invoked.

9. The method of claim 5, further comprising identifying multiple objects based on the object textual identifier.

10. The method of claim 9, further comprising identifying a single object from the multiple objects based on the object not being invoked.

11. The method of claim 10, further comprising identifying a method in the identified object based on the method textual identifier, wherein the identified callable programming unit is the identified method.

12. The method of claim 1, further comprising:
receiving a request using a first thread; and
invoking the identified callable programming unit using a second thread.

13. The method of claim 12, wherein the first thread is asynchronous of the second thread.

14. The method of claim 13, wherein the first thread and the second thread are two different threads.

15. The method of claim 13, wherein the first thread and the second thread are the same thread, but are asynchronous to each other due to thread scheduling.

16. The method of claim 1 further comprising:
receiving, by the SVM, the second request, wherein the second request is formed and sent by the SVM;
identifying a second callable programming unit within the computer program based on the second target service textual identifier, wherein the second target service textual identifier is the reply-to service textual identifier from the first request; and
invoking the second identified callable programming unit and providing the second parameter to the second identified callable programmable unit, wherein the second parameter is the result received from the invoked callable programming unit.

17. A non-transitory computer-readable storage medium storing instructions for performing a method for processing in a computer program a request received by a service virtual machine (SVM), comprising:
instructions for receiving, by the SVM, a first request from within the computer program, wherein the received first request includes a target service textual identifier and a parameter, and the instructions for identifying, based on the received target service textual identifier, a callable programming unit within the computer program;
instructions for invoking the identified callable programming unit and providing a value of the received parameter to the invoked callable programming unit;
instructions for in an event the received first request includes a reply-to service textual identifier:
receiving a result from the invoked callable programming unit;
forming a reply-to request, wherein the formed reply-to request includes a second target service textual identifier and a second parameter, wherein the second target service textual identifier is the received reply-to service textual identifier, and wherein the second parameter is the result received from the invoked callable programming unit; and
sending the formed reply-to request to the SVM from within the computer program.

* * * * *